(12) United States Patent
Park et al.

(10) Patent No.: US 12,107,256 B2
(45) Date of Patent: *Oct. 1, 2024

(54) CATHODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Sang Min Park, Daejeon (KR); Tae Kyoung Lee, Daejeon (KR); Sang Bok Kim, Daejeon (KR); Jik Soo Kim, Daejeon (KR); Sang Hye Shin, Daejeon (KR); Yu Na Shim, Daejeon (KR); Jeong Bae Yoon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 3 days.

This patent is subject to a terminal disclaimer.

(21) Appl. No.: 18/093,215

(22) Filed: Jan. 4, 2023

(65) Prior Publication Data

US 2023/0207778 A1    Jun. 29, 2023

Related U.S. Application Data

(63) Continuation of application No. 17/534,202, filed on Nov. 23, 2021, now Pat. No. 11,621,412.

(30) Foreign Application Priority Data

Mar. 8, 2021 (KR) ......................... 10-2021-0030163
Jun. 1, 2021 (KR) ......................... 10-2021-0071046

(51) Int. Cl.
*H01M 4/131* (2010.01)
*H01M 4/04* (2006.01)
*H01M 4/133* (2010.01)
*H01M 4/1391* (2010.01)
*H01M 4/1393* (2010.01)
*H01M 4/525* (2010.01)
*H01M 10/0525* (2010.01)

(52) U.S. Cl.
CPC ......... *H01M 4/131* (2013.01); *H01M 4/0471* (2013.01); *H01M 4/133* (2013.01); *H01M 4/1391* (2013.01); *H01M 4/1393* (2013.01); *H01M 4/525* (2013.01); *H01M 10/0525* (2013.01)

(58) Field of Classification Search
None
See application file for complete search history.

(56) References Cited

PUBLICATIONS

"Transition metal—Wikipedia", Dec. 31, 2020, XP093032392, Url: https://en.wikipedia.org/wiki/Transition_metal.
Office Action issued by the EPO on Jun. 1, 2023 for Application No. 22160613.0

*Primary Examiner* — Carlos Barcena
(74) *Attorney, Agent, or Firm* — IP & T GROUP LLP

(57) ABSTRACT

The cathode active material for a lithium secondary battery according to embodiments of the present invention includes lithium-transition metal composite oxide particles including a plurality of primary particles, and the lithium-transition metal composite oxide particles have a lithium-potassium-containing portion formed between the primary particles. Thereby, it is possible to improve life-span properties and capacity properties by preventing the layer structure deformation of the primary particles and removing residual lithium.

14 Claims, 6 Drawing Sheets

[FIG. 1]
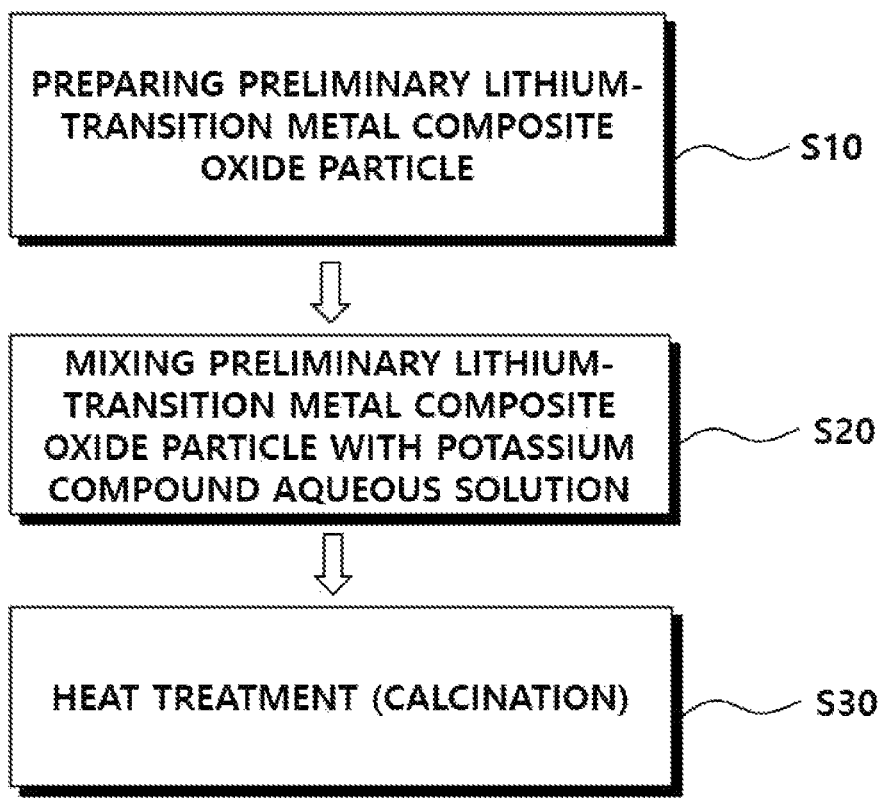

[FIG. 2]
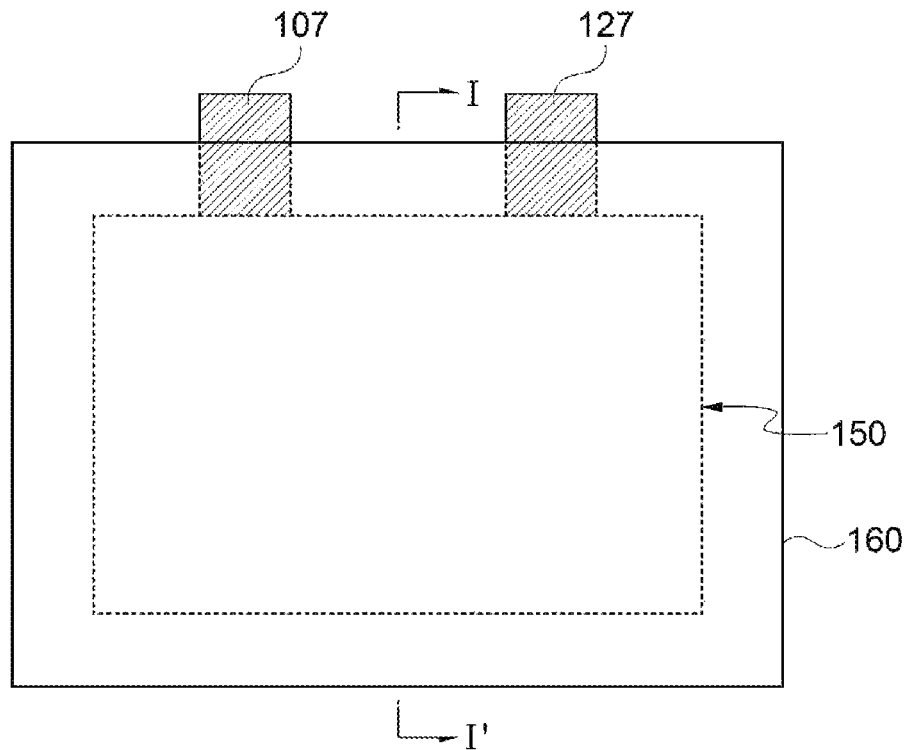
[FIG. 3]
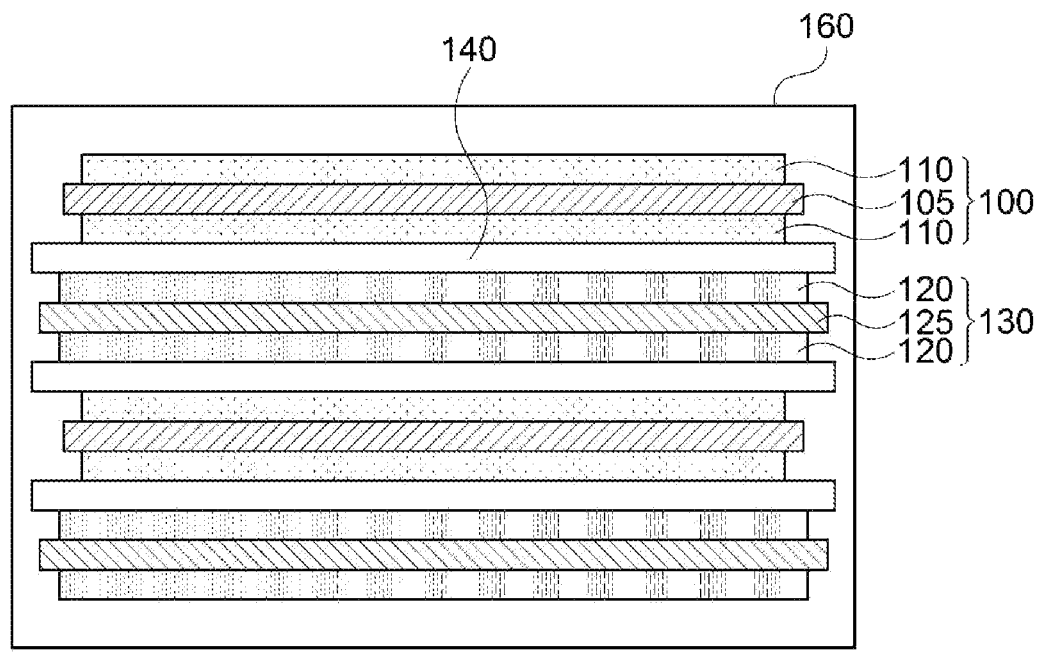

[FIG. 4A]
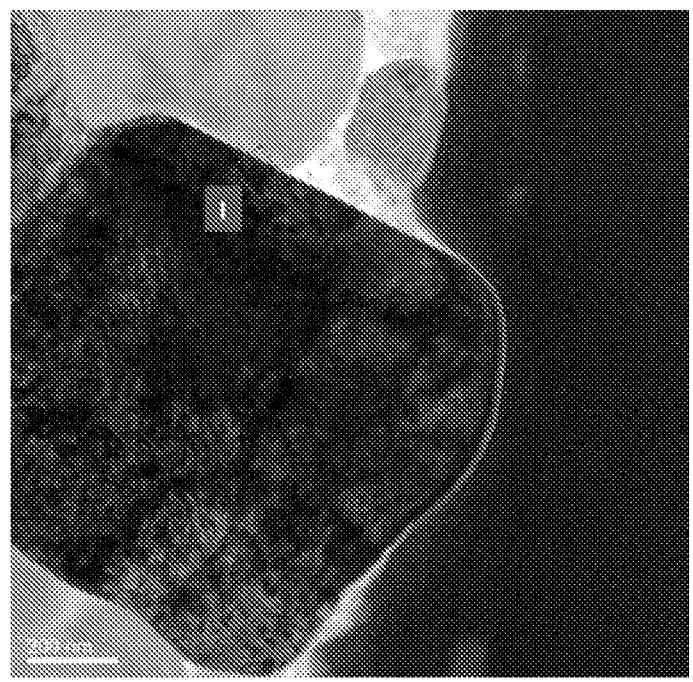
[FIG. 4B]
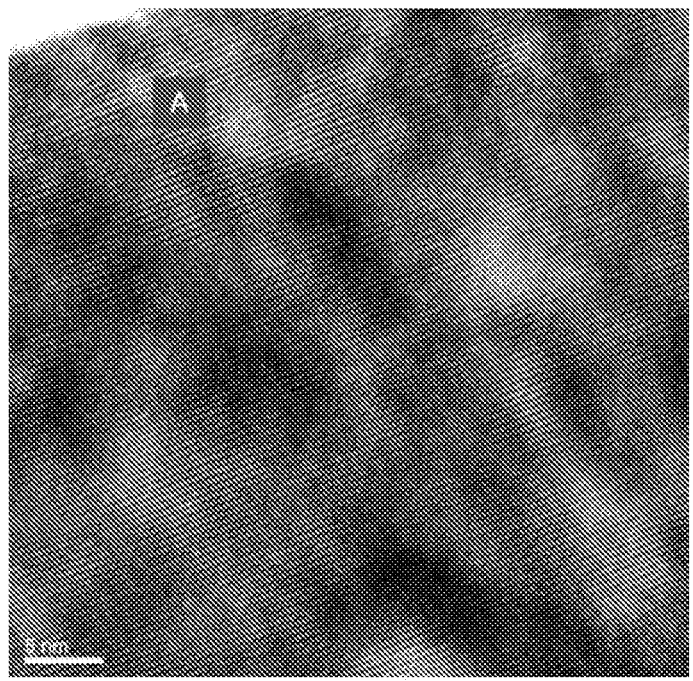

[FIG. 5A]
[FIG. 5B]
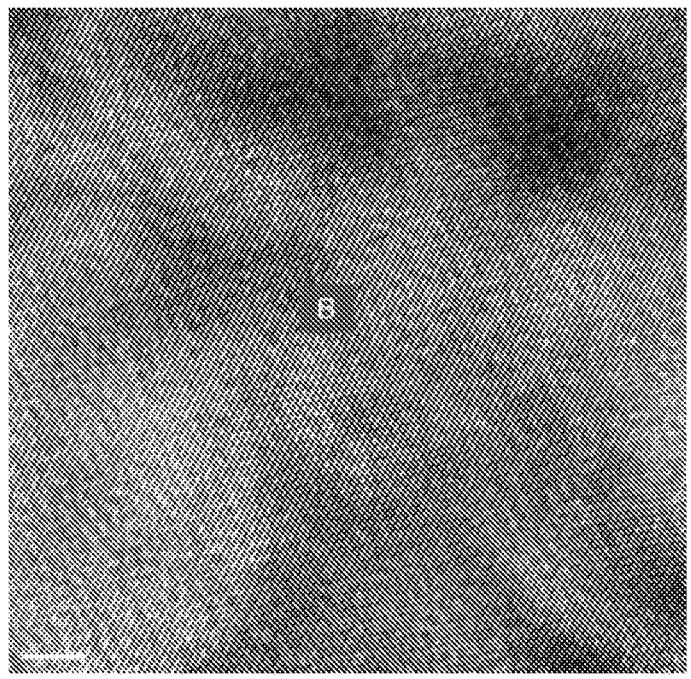

[FIG. 6A]
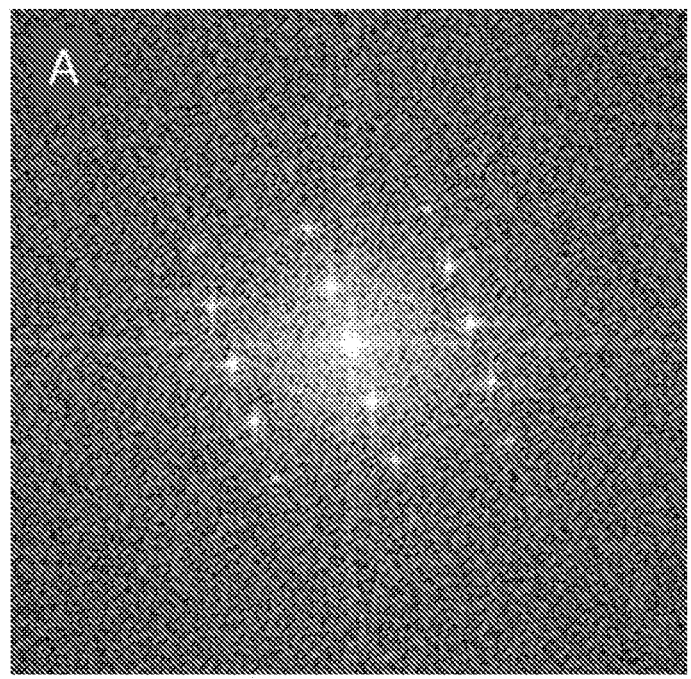
[FIG. 6B]
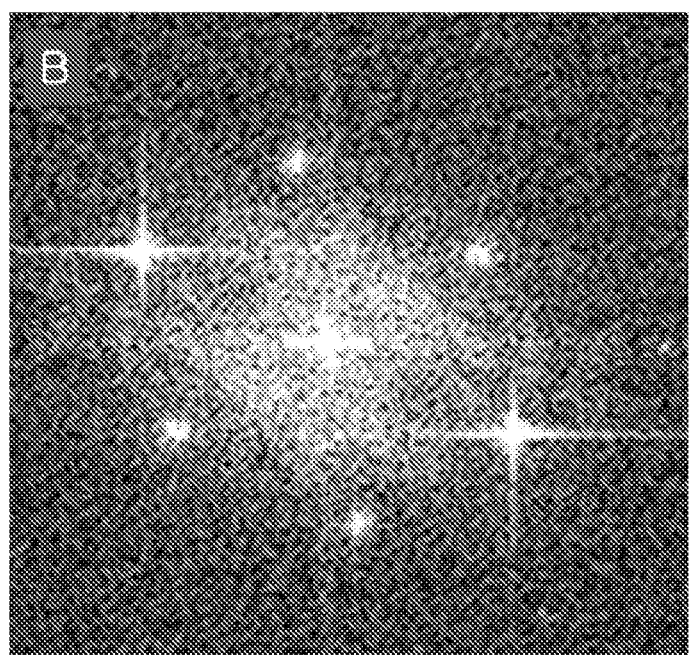

[FIG. 7]
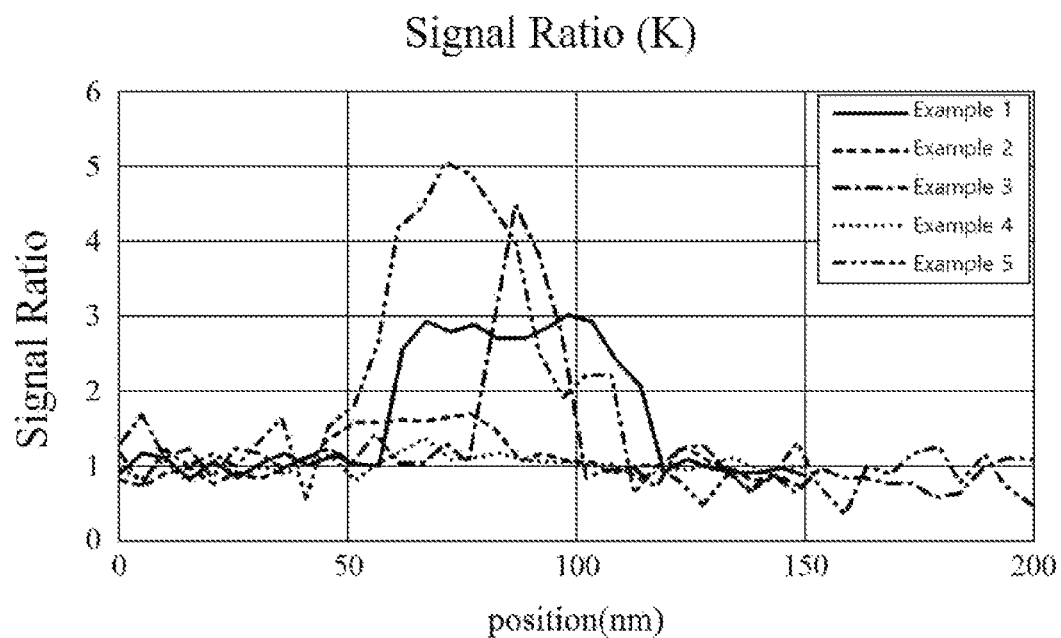

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION(S)

This application is a continuation application of U.S. patent application Ser. No. 17/534,202 filed on Nov. 23, 2021, which claims priority to Korean Patent Application No. 10-2021-0030163 filed on Mar. 8, 2021 and Korean Patent Application No. 10-2021-0071046 filed on Jun. 1, 2021 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a method of manufacturing the same, and more particularly, to a lithium metal oxide-based cathode active material for a lithium secondary battery and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight, such that development thereof has been proceeded in this regard.

The lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

As an active material for a cathode of a lithium secondary battery, a lithium-transition metal composite oxide may be used. Examples of the lithium-transition metal composite oxide may include a nickel-based lithium metal oxide.

A lithium secondary battery having longer life-span, high capacity, and operational stability is required as the application range thereof is expanded. In the lithium-transition metal composite oxide used as the active material for a cathode, when non-uniformity in the chemical structure is caused due to precipitation of lithium, etc., it may be difficult to implement a lithium secondary battery having desired capacity and life-span. In addition, when a deformation or damage of the lithium-transition metal composite oxide structure is caused during repeated charging and discharging, life-span stability and capacity maintenance properties may be reduced.

For example, Korean Patent Registration Publication No. 10-0821523 discloses a method of removing lithium salt impurities by washing a lithium-transition metal composite oxide with water, but there is a limitation in sufficient removal of the impurities, and a damage to the surface of particles may be caused in a water washing process.

PRIOR ART DOCUMENT

Patent Document (Patent Document) Korean Patent Registration Publication No. 10-0821523

SUMMARY OF THE INVENTION

It is an object of the present invention to provide a cathode active material for a lithium secondary battery having improved operational stability and electrochemical properties, and a method of manufacturing the same.

Another object of the present invention to provide a lithium secondary battery including the cathode active material having improved operational stability and electrochemical properties.

To achieve the above objects, according to an aspect of the present invention, there is provided a cathode active material for a lithium secondary battery including: a lithium-transition metal composite oxide particles comprising a plurality of primary particles, wherein the lithium-transition metal composite oxide particle comprises a lithium-potassium-containing portion formed between the primary particles.

In some embodiments, the lithium-potassium-containing portion may include a lithium-potassium-sulfur-containing portion which contains lithium, potassium and sulfur.

In some embodiments, the primary particles may have a hexagonal close-packed structure.

In some embodiments, the lithium-transition metal composite oxide particle may have no primary particle having a face centered cubic structure.

In some embodiments, a sulfur content of the lithium-transition metal composite oxide particle measured through a carbon-sulfur (CS) analyzer may be 1,100 to 4,500 ppm based on a total weight of the lithium-transition metal composite oxide particle.

In some embodiments, a potassium concentration of the lithium-potassium-containing portion measured through energy dispersive spectroscopy (EDS) may be greater than the potassium concentration in the primary particles measured through the EDS.

In some embodiments, an average potassium signal value of the lithium-potassium-containing portion measured through the EDS may be 1.2 to 4 times the average potassium signal value in the primary particles measured through the EDS.

In some embodiments, a content of lithium carbonate ($Li_2CO_3$) remaining on the surface of the lithium-transition metal composite oxide particle may be 2,500 ppm or less, and a content of lithium hydroxide (LiOH) remaining on the surface of the lithium-transition metal composite oxide particle is 2,500 ppm or less.

According to another aspect of the present invention, there is provided a method of manufacturing a cathode active material for a lithium secondary battery, including: preparing a preliminary lithium-transition metal composite oxide particle; mixing the preliminary lithium-transition metal composite oxide particle with a potassium compound aqueous solution; and performing a heat treatment on the mixed preliminary lithium-transition metal composite oxide particles and the potassium compound aqueous solution, to prepare lithium-transition metal composite oxide particle comprising a plurality of primary particles and a lithium-potassium-containing portion formed between the primary particles.

In some embodiments, the potassium compound aqueous solution may be formed by mixing a solvent with potassium compound powder, and an input amount of the potassium compound powder may be 0.2 to 1.9% by weight based on a total weight of the preliminary lithium-transition metal composite oxide particle.

In some embodiments, an input amount of the solvent may be 2 to 15% by weight based on the total weight of the preliminary lithium-transition metal composite oxide particle.

In some embodiments, the potassium compound powder may be potassium hydrogen sulfate ($KHSO_4$) powder.

In some embodiments, the heat treatment may be performed at 200 to 400° C. under an oxygen atmosphere.

In some embodiments, the preliminary lithium-transition metal composite oxide particles may be mixed with the potassium compound aqueous solution without water washing treatment.

According to another aspect of the present invention, there is provided a lithium secondary battery including: a cathode which comprises a cathode active material layer comprising the cathode active material for a lithium secondary battery according to the above-described embodiments; and an anode disposed to face the cathode.

The cathode active material according to embodiments of the present invention may include lithium-transition metal composite oxide particles including the plurality of primary particles, and the lithium-transition metal composite oxide particles may include the lithium-potassium-containing portion formed between the primary particles. In this case, residual lithium located on the surface of the lithium-transition metal composite oxide reacts with the potassium-containing compound to be converted into the lithium-potassium-containing portion, such that initial capacity and battery efficiency properties may be improved.

In some embodiments, by forming the lithium-potassium-containing portion having a hexagonal close-packed structure between the primary particles in the lithium-transition metal composite oxide, the surface of the primary particles is protected by the lithium-potassium-containing portion, such that the life-span properties and driving stability may be improved.

In the method of manufacturing a cathode active material according to the embodiments of the present invention, a potassium compound aqueous solution may be prepared by mixing a solvent in an amount of 2 to 15 wt. % based on the total weight of the preliminary lithium-transition metal composite oxide particles with potassium compound powder in an amount of 0.2 to 1.9 wt. % based on the total weight the preliminary lithium-transition metal composite oxide particles without including a water washing treatment process. The potassium compound aqueous solution may be mixed with the preliminary lithium-transition metal composite oxide particles.

In this case, it is possible to prevent the primary particles of the lithium-transition metal composite oxide particles from being deformed from the hexagonal close-packed structure to the face centered cubic structure during water washing treatment. Thereby, it is possible to prevent the initial capacity and life-span properties of the secondary battery from being reduced. In addition, residual lithium located on the surface portion of the lithium-transition metal composite oxide particles and between the primary particles is removed, such that a deterioration in the life-span properties due to gas generation may be prevented, and battery resistance may be reduced to improve initial capacity.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a process flow chart illustrating a method of manufacturing a cathode active material according to exemplary embodiments;

FIGS. 2 and 3 are a schematic plan view and a cross-sectional view of a lithium secondary battery according to exemplary embodiments, respectively;

FIGS. 4A and 4B are high-resolution transmission electron microscopy (HR-TEM) images of lithium-transition metal composite oxide particles according to Example 1;

FIGS. 5A and 5B are HR-TEM images of lithium-transition metal composite oxide particles according to Comparative Example 1;

FIGS. 6A and 6B are fast Fourier transform (FFT) images in a region A of FIG. 4B and FFT images in a region B of FIG. 5B; and FIG. 7 is a graph illustrating potassium signal values of a primary particle region and a region between the primary particles (e.g., a lithium-potassium-containing portion) of Examples 1 to 5.

DETAILED DESCRIPTION OF THE INVENTION

Embodiments of the present invention provide a cathode active material including lithium-transition metal composite oxide particles and a lithium secondary battery including the same.

Hereinafter, exemplary embodiments of the present invention will be described in detail with reference to the accompanying drawings. However, these embodiments are merely an example, and the present invention is not limited to the specific embodiments described as the example.

In exemplary embodiments, the cathode active material may include a lithium-transition metal composite oxide particle including a plurality of primary particles, and the lithium-transition metal composite oxide particle may include a lithium-potassium (Li-K)-containing portion formed between the primary particles.

In some embodiments, the primary particle may have a single crystal or polycrystalline structure in crystallography.

For example, the primary particles may include nickel (Ni), and may further include at least one of cobalt (Co) and manganese (Mn).

For example, the primary particles may have a composition represented by Formula 1 below:

$$Li_aNi_xM_{1-x}O_{2+y}$$ [Formula 1]

In Formula 1, a, x and y may be in a range of $0.9 \leq a \leq 1.2$, $0.5 \leq x \leq 0.99$, and $-0.1 \leq y \leq 0.1$, respectively. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn, Ba or Zr.

In some preferred embodiments, a molar ratio or concentration x of Ni in Formula 1 may be 0.8 or more.

For example, when employing a composition of high-nickel (high-Ni) contents in which x is 0.8 or more, calcination of the lithium-transition metal composite oxide particles may be performed at a relatively low temperature. In this case, an amount of residual lithium generated on the surface of the lithium-transition metal composite oxide particles may be increased. Accordingly, a water washing process or a non-water washing process (e.g., an initial wetting method) for removing the same may be performed. Therefore, when x is 0.8 or more, for example, the above process for removing the residual lithium may be substantially significant.

Ni may be provided as a transition metal associated with the output and capacity of the lithium secondary battery. Therefore, as described above, by employing the composition of high-nickel (high-Ni) contents in the lithium-transition metal composite oxide particles, it is possible to provide a high-power cathode and a high-power lithium secondary battery.

However, as the content of Ni is increased, the long-term storage stability and life-span stability of the cathode or the secondary battery may be relatively deteriorated. However, according to exemplary embodiments, by including Co, the life-span stability and capacity retention properties may be improved through Mn while maintaining electrical conductivity.

In some embodiments, the lithium-potassium-containing portion may include a lithium-potassium-sulfur (Li-K-S)-containing portion which contains lithium, potassium and sulfur (S). For example, the lithium-potassium-containing portion may include $LiKSO_4$. In this case, the output properties of the secondary battery may be improved due to the excellent conductivity of $LiKSO_4$.

In some embodiments, the primary particles of the lithium-transition metal composite oxide particles may have a hexagonal close-packed structure. Accordingly, a large amount of lithium and transition metal elements may be included in a stable structure having a layered form even in a small space, such that the capacity properties and life-span properties of the secondary battery may be improved.

In some embodiments, a potassium concentration of the lithium-potassium-containing portion measured through energy-dispersive X-ray spectroscopy (EDS) may be greater than the potassium concentration in the primary particles measured through the EDS. In this case, the lithium-transition metal composite oxide particles may form a concentration gradient across the primary particles and the lithium-potassium-containing portion.

For example, an average potassium signal value of the lithium-potassium-containing portions measured through the EDS may be 1.2 to 4 times greater than the average potassium signal value in the primary particles.

When a ratio of the average potassium signal value satisfies the above range, the lithium-potassium-containing portion having a hexagonal close-packed structure may be sufficiently formed between the primary particles included in the lithium-transition metal composite oxide particles. In this case, the surface of the primary particles may be protected by the lithium-potassium-containing portion, thereby reducing an area where the primary particles are exposed to an electrolyte. Accordingly, the life-span properties of the secondary battery may be improved. In addition, as residual lithium on the surface of the lithium-transition metal composite oxide particles has been sufficiently removed, the electrochemical properties of the secondary battery may be improved in this state.

In some embodiments, a content of lithium precursor remaining on the surface of the lithium-transition metal composite oxide particles may be controlled.

For example, the content of lithium carbonate ($Li_2CO_3$) remaining on the surface of the lithium-transition metal composite oxide particles may be 2,500 ppm or less, and the content of lithium hydroxide (LiOH) remaining on the surface of the lithium-transition metal composite oxide particles may be 2,500 ppm or less.

When the contents of lithium carbonate and lithium hydroxide satisfy the above ranges, a resistance may be decreased during lithium ion movement, such that the initial capacity properties and output properties of the lithium secondary battery may be improved, and life-span properties during repeated charging and discharging may be enhanced.

In some embodiments, a sulfur content included in the lithium-transition metal composite oxide particles may be 1,100 to 4,500 ppm based on a total weight of the lithium-transition metal composite oxide particles. For example, a lithium-sulfur compound present on the surface of the lithium-transition metal composite oxide particles may not only protect the surface of the particles from the electrolyte, but also advantageously act on the lithium ion movement in the electrolyte and the surface. In this case, it is possible to prevent deterioration in the capacity properties and life-span properties due to excessive potassium addition, while sufficiently removing residual lithium together with the potassium compound, which will be described below. Accordingly, it is possible to maintain the output properties of the secondary battery while improving the capacity retention rate thereof.

For example, the sulfur content may be measured through a carbon-sulfur (CS) analyzer.

FIG. 1 is a process flow chart illustrating a method of manufacturing a cathode active material according to exemplary embodiments.

Hereinafter, description of the method of manufacturing the cathode active material for a lithium secondary battery according to exemplary embodiments described above will be provided with reference to FIG. 1.

Referring to FIG. 1, a preliminary lithium-transition metal composite oxide particle may be prepared (e.g., step S10).

For example, the preliminary lithium-transition metal composite oxide particle may be prepared by reacting a transition metal precursor with a lithium precursor. The transition metal precursor (e.g., Ni-Co-Mn precursor) may be prepared through a co-precipitation reaction.

For example, the transition metal precursor may be prepared through a co-precipitation reaction of metal salts. The metal salts may include nickel salts, manganese salts and cobalt salts.

Examples of the nickel salt may include nickel sulfate, nickel hydroxide, nickel nitrate, nickel acetate, and a hydrate thereof, etc. Examples of the manganese salt may include manganese sulfate, manganese acetate, and a hydrate thereof, etc. Examples of the cobalt salt may include cobalt sulfate, cobalt nitrate, cobalt carbonate, and a hydrate thereof, etc.

The metal salts may be mixed with a precipitant and/or a chelating agent in a ratio satisfying the content of each metal or the concentration ratios described with reference to Formula 1 to prepare an aqueous solution. The aqueous solution may be co-precipitated in a reactor to prepare the transition metal precursor.

The precipitant may include an alkaline compound such as sodium hydroxide (NaOH), sodium carbonate ($Na_2CO_3$) and the like. The chelating agent may include, for example, ammonia water (e.g., $NH_3H_2O$), ammonium carbonate (e.g., $NH_3HCO_3$) and the like.

The temperature of the co-precipitation reaction may be controlled, for example, in a range of about 40° C. to 60° C. The reaction time may be controlled in a range of about 24 to 72 hours.

The lithium precursor compound may include, for example, lithium carbonate, lithium nitrate, lithium acetate, lithium oxide, lithium hydroxide and the like. These compounds may be used alone or in combination of two or more thereof.

In exemplary embodiments, the potassium compound aqueous solution may be input into the preliminary lithium-transition metal composite oxide particle and mixed (e.g., step S20).

In some embodiments, the potassium compound aqueous solution may include a solvent and potassium compound powder input into the solvent.

For example, the potassium compound powder may be input in an amount of 0.2 to 1.9 wt. % based on the total weight of the preliminary lithium-transition metal composite oxide particle. In this case, it is possible to prevent deterioration in capacity properties and life-span properties due to excessive input of the potassium compound, while the residual lithium and the potassium compound sufficiently react. Thereby, it is possible to implement a cathode active material having excellent life-span properties and capacity properties due to having an appropriate sulfur content.

For example, the solvent may be used in an amount of 2 to 15 wt. % based on the total weight of the preliminary lithium-transition metal composite oxide particle. In this case, it is possible to prevent deformation of the layered structure of the primary particles due to excessive solvent input, while the potassium compound powder is also sufficiently dissolved. Accordingly, it is possible to maintain the capacity properties and output properties while improving the life-span properties.

In some embodiments, the potassium compound powder may be input into the solvent so that the content thereof is 50 wt. % or less based on the weight of the solvent to prepare the potassium compound aqueous solution. When inputting the potassium compound powder into the solvent within the above range, the potassium compound powder is sufficiently dissolved in the solvent while the residual lithium and the potassium compound sufficiently react, such that workability may be improved.

In some embodiments, the potassium compound powder may be potassium hydrogen sulfate ($KHSO_4$) powder, and in this case, the potassium compound aqueous solution may be a $KHSO_4$ aqueous solution.

For example, the solvent may be de-ionized water (DIW).

In exemplary embodiments, the preliminary lithium-transition metal composite oxide particle and the potassium compound aqueous solution may be mixed. In this case, potassium and/or sulfur contained in the potassium compound aqueous solution acts with residual lithium present on the surface of the preliminary lithium-transition metal composite oxide particle to be converted into a lithium-potassium-containing portion (e.g., a lithium-potassium-sulfur-containing portion). Accordingly, it is possible to obtain a lithium-transition metal composite oxide particle including the primary particles and the lithium-potassium-containing portion. For example, impurities present on the surface of the preliminary lithium-transition metal composite oxide particles may be removed through the mixing process. For example, in order to improve a yield of lithium metal oxide particles or stabilize a synthesis process, the lithium precursor (lithium salt) may be used in an excess amount. In this case, a lithium precursor including lithium hydroxide (LiOH) and lithium carbonate ($Li_2CO_3$) may remain on the surface of the preliminary lithium-transition metal composite oxide particles.

In addition, for example, as the lithium-transition metal composite oxide particles contain the composition of higher-Ni contents, calcination may be performed at a lower temperature when manufacturing the cathode. In this case, a content of residual lithium on the surface of the lithium-transition metal composite oxide particles may be increased.

When the residual lithium is removed by washing with water (water washing treatment) in substantially the same amount as the cathode active material, the residual lithium may be removed, but oxidation of the surface of the preliminary lithium-transition metal composite oxide particle and side reactions with water may be caused, thereby resulting in a damage or collapse of the layered structure of the primary particles. In addition, as the layered structure is deformed into the face centered cubic structure, spinel structure and/or rock salt structure rather than the hexagonal close-packed structure by water, the lithium-nickel-based oxide may be hydrolyzed to form nickel impurities such as NiO or $Ni(OH)_2$.

However, according to exemplary embodiments of the present application, since the mixing process (e.g., initial wetting method) is performed using the potassium compound aqueous solution without water washing treatment, passivation due to the potassium-containing compound may be implemented on the surface of the lithium-transition metal composite oxide particles while the mixing process is performed. For example, the lithium-potassium-containing portion in which lithium and potassium are bonded may be formed between the primary particles having the hexagonal close-packed structure.

The term "initial wetting method" as used herein may refer to, for example, a method of inputting 15 wt. % or less of water or the potassium compound aqueous solution by, for instance, a spray method, based on the total weight of the lithium-transition metal composite oxide particles without performing water washing treatment of inputting water in an amount substantially the same as or similar to the total weight of the lithium-transition metal composite oxide particles and stirring.

In addition, since water washing treatment is not performed, for example, the lithium-transition metal composite oxide particle may not include the primary particles having the face centered cubic structure. Therefore, the residual lithium may be effectively removed while preventing oxidation and damage to the layered structure due to water on the particle surface.

For example, when directly mixing the potassium compound powder with the lithium-transition metal composite oxide particle instead of the potassium compound aqueous solution, since the potassium compound powder does not have a capillary force, it cannot spread between the primary particles, and most of the potassium compound powder may react with the residual lithium present on the surface of the secondary particles in which the primary particles are aggregated. For example, the lithium-potassium-containing portion may be formed in the form of being coated on the surface of secondary particles. In this case, the surface of the primary particles may not be sufficiently protected when impregnating the electrolyte, and the residual lithium may remain on the surface between the primary particles, thereby causing an increase in the battery resistance. Accordingly, the capacity and output properties of the battery may be reduced.

According to exemplary embodiments of the present application, the initial wetting method may be performed using the potassium compound aqueous solution as described above. In this case, the potassium compound aqueous solution may permeate between the primary particles by the capillary force and react with the residual lithium between the primary particles to form the lithium-potassium-containing portion between the primary particles.

In some embodiments, the potassium compound content in the potassium compound aqueous solution may be 0.1 to 2 wt. % based on the total weight of the preliminary lithium-transition metal composite oxide particle. In this case, while the lithium-potassium-containing portion is also formed to have an appropriate lithium/potassium content at a position where the residual lithium was present between the surface portion of the preliminary lithium-transition metal composite oxide particle and the primary particles, substantially as in the case of water washing treatment, it is possible to prevent a damage or collapse of the layered structure of the primary particles from being caused.

After the mixing process, a cathode active material including the primary particles and the lithium-potassium-containing portion may be obtained through a heat treatment (calcination) process (e.g., step S30).

For example, the preliminary lithium-transition metal composite oxide particle and the lithium-potassium-containing portion on which the mixing process has been performed may be subjected to heat treatment using a calcination furnace. Accordingly, it is possible to obtain lithium-transition metal composite oxide particles in which the lithium-potassium-containing portion is fixed between the primary particles.

For example, the heat treatment may be performed at 200 to 400° C. under an oxygen atmosphere. In this case, the residual lithium on the surface of the preliminary lithium-transition metal composite oxide particles and the potassium compound of the potassium compound aqueous solution may be sufficiently bonded to form the lithium-potassium-containing portion.

FIGS. 2 and 3 are a schematic plan view and a cross-sectional view of a lithium secondary battery according to exemplary embodiments, respectively.

Hereinafter, description of a lithium secondary battery including a cathode including the cathode active material for a lithium secondary battery described above will be provided with reference to FIGS. 2 and 3.

Referring to FIGS. 2 and 3, the lithium secondary battery may include a cathode 100, an anode 130, and a separation membrane 140 including the cathode active material which includes the above-described lithium-potassium-containing portion.

The cathode 100 may include a cathode active material layer 110 formed by applying the above-described cathode active material including the lithium-transition metal oxide particles to a cathode current collector 105.

For example, a slurry may be prepared by mixing and stirring the preliminary lithium-transition metal oxide particles mixed with the potassium compound aqueous solution with a binder, a conductive material and/or a dispersant in a solvent. The cathode current collector 105 may be coated with the slurry, followed by compressing and drying to prepare the cathode.

The cathode current collector 105 may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as the binder for forming the cathode. In this case, an amount of the binder for forming the cathode active material layer 110 may be reduced and an amount of the cathode active material may be relatively increased, thereby improving the output and capacity of the secondary battery.

The conductive material may be included to facilitate electron movement between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode 130 may include an anode current collector 125 and an anode active material layer 120 formed by coating the anode current collector 125 with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, meso-carbon microbead (MCMB), mesophase pitch-based carbon fiber (MPCF) or the like. Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The anode current collector 125 may include stainless steel, nickel, aluminum, titanium, copper, or an alloy thereof, and preferably includes aluminum or an aluminum alloy.

In some embodiments, a slurry may be prepared by mixing the anode active material with an anode forming binder, a conductive material and/or a dispersant in a solvent. The anode current collector may be coated with the slurry, followed by compressing and drying to prepare the anode 130.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

The separation membrane 140 may be interposed between the cathode 100 and the anode 130. The separation membrane 140 may include a porous polymer film made of a polyolefin polymer such as ethylene homopolymer, propylene homopolymer, ethylene/butene copolymer, ethylene/ hexene copolymer, ethylene/methacrylate copolymer. The separation membrane 140 may include a nonwoven fabric made of glass fiber having a high melting point, polyethylene terephthalate fiber or the like.

According to exemplary embodiments, an electrode cell is defined by the cathode 100, the anode 130, and the separation membrane 140, and a plurality of the electrode cells are stacked to form a jelly roll type electrode assembly 150, for example. For example, the electrode assembly 150 may be formed by winding, lamination, folding, or the like of the separation membrane 140.

The electrode assembly may be housed in an outer case 160 together with the electrolyte, such that a lithium secondary battery may be defined. According to exemplary embodiments, a non-aqueous electrolyte may be used as the electrolyte.

The non-aqueous electrolyte includes a lithium salt as an electrolyte and an organic solvent. The lithium salt is represented by, for example, $Li^+X^-$ and may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like as an example.

Examples of the organic solvent may use any one of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof. These compounds may be used alone or in combination of two or more thereof.

As shown in FIG. 3, electrode tabs (a cathode tab and an anode tab) may protrude from the cathode current collector 105 and the anode current collector 125, respectively, which belong to each electrode cell, and may extend to one side of the outer case 160. The electrode tabs may be fused together with the one side of the outer case 160 to form electrode leads (a cathode lead 107 and an anode lead 127) extending or exposed to an outside of the outer case 160.

The lithium secondary battery may be manufactured, for example, in a cylindrical shape using a can, a square shape, a pouch type or a coin shape.

According to exemplary embodiments, a lithium secondary battery having improved life-span and long-term stability while suppressing a decrease in capacity and average voltage by improving chemical stability of the cathode active material by doping or coating with the potassium-containing compound may be implemented.

Hereinafter, experimental examples including specific examples and comparative examples will be described to more concretely understand the present invention. However, those skilled in the art will appreciate that such examples are provided for illustrative purposes and do not limit subject matters to be protected as disclosed in appended claims. Therefore, it will be apparent to those skilled in the art various alterations and modifications of the embodiments are possible within the scope and spirit of the present invention and duly included within the range as defined by the appended claims.

Example 1

Preparation of Preliminary Lithium-transition Metal Composite Oxide Particles (S10)

$NiSO_4$, $CoSO_4$ and $MnSO_4$ were mixed in a ratio of 0.88:0.09:0.03, respectively, using distilled water from which internal dissolved oxygen is removed by bubbling with $N_2$ for 24 hours. The solution was input into a reactor at 50° C., and a co-precipitation reaction was performed for 48 hours using NaOH and $NH_3H_2O$ as a precipitant and a chelating agent to obtain $Ni_{0.88}Co_{0.09}Mn_{0.03}(OH)_2$ as a transition metal precursor. The obtained precursor was dried at 80° C. for 12 hours, and then again dried at 110° C. for 12 hours.

Lithium hydroxide and the transition metal precursor were added to a dry high-speed mixer in a ratio of 1.01:1, and the mixture was uniformly mixed for 5 minutes. The mixture was put into a calcination furnace, and heated to 710 to 750° C. at a heating rate of 2° C./rain, then maintained at 710 to 750° C. for 10 hours. Oxygen was passed continuously at a flow rate of 10 mL/min during heating and maintenance. After completion of the calcination, the mixture was naturally cooled to room temperature, followed by grinding and classification to prepare a preliminary lithium-transition metal composite oxide particle $LiNi_{0.88}Co_{0.09}Mn_{0.03}O_2$.

Preparation and Mixing of Potassium Compound Aqueous Solution (S20), and Heat Treatment (S30)

Potassium hydrogen sulfate ($KHSO_4$) powder in an amount of 0.8 wt. % based on the total weight of the preliminary lithium-transition metal composite oxide particles was input into de-ionized water (DIW) in an amount of 5 wt. % based on the total weight of the obtained preliminary lithium-transition metal composite oxide particles, and then the mixture was stirred so that the potassium hydrogen sulfate powder was sufficiently dissolved in the de-ionized water to prepare a potassium compound aqueous solution.

The prepared potassium compound aqueous solution was input into the preliminary lithium-transition metal composite oxide particles and mixed.

The mixture was put into the calcination furnace, heated to a temperature between 200 and 400° C. at a heating rate of 2° C./min while supplying oxygen at a flow rate of 10 mL/min, and maintained at the heated temperature for 10 hours. After completion of the calcination, the calcined product was classified by 325 mesh to obtain a cathode active material.

Manufacture of Lithium Secondary Battery

A secondary battery was manufactured using the above-described cathode active material. Specifically, the cathode active material, Denka Black as a conductive material, and PVDF as a binder were mixed in a mass ratio composition of 93:5:2, respectively, to prepare a cathode slurry. Then, the slurry was applied to an aluminum current collector, followed by drying and pressing the same to prepare a cathode. After the press, a target electrode density of the cathode was adjusted to 3.0 g/cc.

Lithium metal was used as an anode active material.

The cathode and anode prepared as described above were notched in a circular shape having a diameter of Φ14 and Φ16, respectively, and laminated, then an electrode cell was prepared by disposing a separation membrane (polyethylene, thickness: 13 μm) notched to Φ19 between the cathode and the anode. The prepared electrode cell was put into a coin cell outer case having a specification of diameter of 20 mm and a height of 1.6 mm, then an electrolyte was injected and assembled, followed by aging for 12 hours or more so that the electrolyte could be impregnated inside the electrodes.

The electrolyte used herein was prepared by dissolving 1M $LiPF_6$ solution in a mixed solvent of EC/EMC (30/70; volume ratio).

The secondary battery manufactured as described above was subjected to formation charging-discharging (charge condition: CC-CV 0.1 C 4.3 V 0.005 C CUT-OFF, discharge condition: CC 0.1 C 3 V CUT-OFF).

Example 2

A cathode active material and a lithium secondary battery were obtained according to the same procedures as described in Example 1, except that potassium hydrogen sulfate ($KHSO_4$) powder was input in an amount of 0.4 wt. % based on the total weight of the preliminary lithium-transition metal composite oxide particle.

Example 3

A cathode active material and a lithium secondary battery were obtained according to the same procedures as described in Example 1, except that potassium hydrogen sulfate ($KHSO_4$) powder was input in an amount of 1.6 wt. % based on the total weight of the preliminary lithium-transition metal composite oxide particle.

Example 4

A cathode active material and a lithium secondary battery were obtained according to the same procedures as described in Example 1, except that potassium hydrogen sulfate ($KHSO_4$) powder was input in an amount of 0.1 wt. % based on the total weight of the preliminary lithium-transition metal composite oxide particle.

Example 5

A cathode active material and a lithium secondary battery were obtained according to the same procedures as described in Example 1, except that potassium hydrogen sulfate ($KHSO_4$) powder was input in an amount of 2.0 wt. % based on the total weight of the preliminary lithium-transition metal composite oxide particle.

Comparative Example 1

A cathode active material and a lithium secondary battery were obtained according to the same procedures as described in Example 1 except that, without performing the step of mixing the preliminary lithium-transition metal composite oxide particles with the potassium compound aqueous solution, the preliminary lithium-transition metal composite oxide particles were input into 100 wt. % of de-ionized water based on the total weight of the preliminary lithium-transition metal composite oxide particles, and the mixture was subjected to water washing treatment by stirring for 10 minutes, followed by drying at 130 to 170° C. under vacuum for 12 hours after filtering.

Comparative Example 2

A cathode active material and a lithium secondary battery were obtained according to the same procedures as described in Example 1, except that de-ionized water was input in an amount of 5 wt. % based on the total weight of the preliminary lithium-transition metal composite oxide particle instead of the potassium compound aqueous solution and mixed.

The above-described examples and Comparative Example 2 were performed by an initial wetting method in which a small amount of solution or water was input, not the water washing treatment in which substantially the same amount of water as the cathode active material was input, and in Comparative Example 1, the water washing treatment was performed.

Experimental Example 1

(1) High-resolution Transmission Electron Microscopy (HR-TEM) and Fast Fourier Transform (FFT) Image Analysis Through HR-TEM analysis and FFT image analysis on cross-sections of the lithium-transition metal composite oxide particles obtained according to the above-described examples and comparative examples, the structure of the compound present in the primary particle region and the lithium-potassium-containing portion (a region between the primary particles) was analyzed.

(2) Calculation of Average Potassium Signal Value

The lithium-transition metal composite oxide particles prepared according to the above-described examples and comparative examples were continuously measured by line scan to obtain potassium signal values in a primary particle region and the region between the primary particles (e.g., lithium-potassium-containing portion) through STEM-EDS. Thereafter, by averaging the potassium signal values for each region, an average potassium signal value of the primary particles and the lithium-potassium-containing portion was calculated.

(3) Measurement of Sulfur Content

To measure a content of sulfur (S), a C/S analyzer (carbon/sulfur analysis equipment; model name: CS844, manufacturer: LECO) was used, and an amount of sample was selected according to the range of measurement values of the standard sample measured when drawing up a calibration curve.

Specifically, 0.02 to 0.04 g of lithium-transition metal composite oxide particles obtained according to the above-described examples and comparative examples were input into the ceramic crucible, and at this time, a combustion improver (LECOCEL II) and IRON chips were mixed in a ratio of 1:1 together.

Thereafter, $O_2$ was supplied as a combustion gas at 3 L/min in a high-frequency induction furnace and burned at about 2,600 to 2,700° C. The sulfur oxide-based inorganic compound gas (e.g., sulfuric acid gas) generated by the combustion is passed through an infrared detection cell, and a change in infrared absorption compared to the blank was measured to quantitatively detect the sulfur content in the lithium-transition metal composite oxide particles.

Input amounts of potassium hydrogen sulfate powder, input amounts of solvent, and the above-described measurement and evaluation results of the examples and comparative examples are shown in Table 1 below.

TABLE 1

| Section | Process type | Potassium hydrogen sulfate (KHSO$_4$) powder input amount (wt. %) | Solvent input amount (wt. %) | Average potassium signal value of primary particles (counts) | Average potassium signal value of lithium-potassium-containing portion (counts) | Signal ratio | Sulfur content (ppm) |
|---|---|---|---|---|---|---|---|
| Example 1 | Initial wetting | 0.8 | 5 | 0.231 | 0.608 | 2.63 | 2,400 |
| Example 2 | Initial wetting | 0.4 | 5 | 0.155 | 0.249 | 1.61 | 1,580 |
| Example 3 | Initial wetting | 1.6 | 5 | 0.154 | 0.532 | 3.46 | 3,100 |
| Example 4 | Initial wetting | 0.1 | 5 | 0.163 | 0.194 | 1.19 | 1,080 |
| Example 5 | Initial wetting | 2 | 5 | 0.188 | 0.075 | 4.10 | 4,600 |
| Comparative Example 1 | Water washing treatment | — | 100 | — | — | — | 630 |
| Comparative Example 2 | Initial wetting | — | 5 | — | — | — | 700 |

FIGS. 4A and 4B are HR-TEM images of lithium-transition metal composite oxide particles according to Example 1. Specifically, FIG. 4A is an HR-TEM image of the lithium-transition metal composite oxide particles of Example 1, and FIG. 4B is an enlarged HR-TEM image of a surface region (a region 1) of the primary particles in FIG. 4A.

FIGS. 5A and 5B are HR-TEM images of lithium-transition metal composite oxide particles according to Comparative Example 1. Specifically, FIG. 5A is an HR-TEM image of the lithium-transition metal composite oxide particles of Comparative Example 1, and FIG. 5B is an enlarged HR-TEM image of an inner region (a region 2) of the primary particles in FIG. 5A.

FIGS. 6A and 6B are FFT images in a region A in FIG. 4B and a region B of FIG. 5B. Specifically, FIG. 6A is an enlarged FFT image of region A in FIG. 4B, and FIG. 6B is an enlarged FFT image of area B in FIG. 5B.

Referring to FIGS. 4A, 4B, 5A, 5B, 6A and 6B, in the case of Comparative Example 1, since the water washing process was performed instead of the initial wetting method, even the layered structure in the inner region (e.g., the region 2 of FIG. 5A and region B in FIG. 5B) of the primary particles having a relatively low probability of damage to the layered structure was defamed into a face centered cubic structure from the hexagonal close-packed structure as shown in 6B.

On the other hand, in the case of Example 1 in which the mixing process (e.g., initial wetting method) was performed by adding the potassium compound aqueous solution, the layered structure in the surface region (e.g., the region 1 of FIG. 4A and region A in FIG. 4B) of the primary particles having a relatively high probability of damage to the layered structure was maintained in the hexagonal close-packed structure as shown in 6B.

FIG. 7 is a graph illustrating potassium signal values of the primary particle region and the region between the primary particles (e.g., lithium-potassium-containing portion) of Examples 1 to 5.

Referring to FIG. 7, in Examples 1 to 3, a ratio of the average potassium signal value in the region between the primary particles to the average potassium signal value in the primary particles (potassium signal ratio) satisfied a range of 1.2 to 4.

However, Example 4, in which the potassium compound powder input amount was less than 0.2 wt. % based on the preliminary lithium-transition metal composite oxide particles, exhibited a low potassium signal ratio of less than 1.2 times, such that it was difficult to determine the lithium-potassium-containing portion in the lithium-transition metal composite oxide particles.

In addition, Example 5, in which the amount of the potassium compound powder input was greater than 1.9 wt. % based on the preliminary lithium-transition metal composite oxide particles, exhibited a potassium signal ratio exceeding 4 times.

On the other hand, in the case of Example 1, the signal ratio of potassium from the region between the primary particles (e.g., lithium-potassium-containing portion) to the 50 nm section was uniformly shown as 2.63 times.

Experimental Example 2

(3) Measurement of Residual Lithium (Li$_2$CO$_3$, LiOH) Content 1.5 g of each of the cathode active materials of the examples and comparative examples was quantified in a 250 mL flask, 100 g of deionized water was input then a magnetic bar was put thereto, and the mixture was stirred at a speed of 60 rpm for 10 minutes. Thereafter, 100 g was sampled after filtering using a flask at reduced pressure. The sampled solution was put into a container of automatic titrator and automatically titrated with 0.1N HCl referring to the Wader's method to measure Li$_2$CO$_3$ and LiOH contents in the solution.

(4) Measurement of Initial Charge/Discharge Capacity and Evaluation of Initial Capacity Efficiency After charging (CC-CV 0.1 C 4.3 V 0.005 C CUT-OFF) the lithium secondary batteries manufactured according to the above-described examples and comparative examples in a chamber at 25° C., battery capacities (initial charge capacities) were measured, and after discharging again (CC 0.1 C 3.0 V CUT-OFF) the same, the battery capacities (initial discharge capacities) were measured.

Initial capacity efficiency of each lithium secondary battery was calculated by dividing the measured initial discharge capacity by the measured initial charge capacity, then converting it into a percentage (%).

(5) Measurement of Capacity Retention Rate (Life-time (cycle) Properties) During Repeated Charging and Discharging The lithium secondary batteries according to the examples and comparative examples were repeatedly charged (CC/CV 0.5 C 4.3 V 0.05 C CUT-OFF) and discharged (CC 1.0 C 3.0 V CUT-OFF) 300 times, then the capacity retention rate was evaluated as a percentage of the discharge capacity at 300 times divided by the discharge capacity at one time.

The evaluation results are shown in Table 2 below.

TABLE 2

| Section | Content of $Li_2CO_3$ (ppm) | Content of LiOH (ppm) | Initial charge capacity (mAh/g) | Initial discharge capacity (mAh/g) | Initial capacity efficiency (%) | Capacity retention rate (%) |
|---|---|---|---|---|---|---|
| Example 1 | 1,670 | 1,510 | 239.0 | 209.9 | 87.82% | 84 |
| Example 2 | 1,937 | 1,870 | 239.5 | 210.7 | 87.97% | 79 |
| Example 3 | 990 | 1,084 | 237.3 | 208.1 | 87.69% | 82 |
| Example 4 | 2,700 | 2,680 | 239.7 | 211.8 | 88.36% | 74 |
| Example 5 | 1,340 | 768 | 236.7 | 205.9 | 87.00% | 82 |
| Comparative Example 1 | 2,210 | 1,390 | 237.2 | 207.8 | 87.60% | 64 |
| Comparative Example 2 | 3,010 | 2,730 | 239.5 | 212.6 | 88.80% | 68 |

Referring to Table 2, in the case of the examples in which the initial wetting method was performed by mixing the potassium compound aqueous solution, the content of lithium remaining on the surface of the lithium-transition metal composite oxide particles was reduced compared to the comparative examples as a whole, and good initial capacity efficiency and excellent life-span properties were secured.

In the case of Example 1 among the examples in which the ratio of the average potassium signal values in the primary particles and the lithium-potassium-containing portion satisfied a predetermined range (e.g., 1.2 to 4), the initial capacity was maintained compared to Comparative Example 2 in which only the same wt. % of de-ionized water was used instead of the potassium compound aqueous solution, as well as improved life-span properties were secured due to the passivation effect by the lithium-potassium-containing compound formed by reacting with residual lithium on the surface of the lithium-transition metal composite oxide particles.

However, in the case of Example 4 in which the potassium compound powder was input in an amount of less than 0.2 wt. %, since the potassium-containing compound to react with the residual lithium was not enough, the residual lithium was slightly increased and the capacity retention rate was slightly reduced compared to Examples 1 to 3.

In addition, in the case of Example 5, in which the potassium compound powder was input exceeding 1.9 wt. %, the potassium to react with the residual lithium was increased to ensure an excellent effect of reducing the residual lithium, but due to excessive input of the potassium compound, discharge capacity, efficiency, and life-span properties were slightly reduced compared to Examples 1 to 3. In addition, due to unreacted potassium hydrogen sulfate and lithium-potassium-based compound on the surface of the active material, the content of residual lithium carbonate ($Li_2CO_3$) was rather increased compared to Example 3. Further, in the case of Example 5, a trade-off phenomenon, in which the capacity retention rate was relatively improved due to a decrease in the discharge capacity, occurred.

In the case of Comparative Example 1 using the conventional water washing method, the residual lithium reduction effect was excellent, but as the layered structure of the primary particles is deformed during the water washing treatment, the initial capacity, efficiency, life-span and electrochemical properties were greatly reduced compared to the examples and Comparative Example 2.

DESCRIPTION OF REFERENCE NUMERALS

100: Cathode
105: Cathode current collector
107: Cathode lead
110: Cathode active material layer
120: Anode active material layer
125: Anode current collector
127: Anode lead
130: Anode
140: Separation membrane
150: Electrode assembly
160: Case

What is claimed is:
1. A cathode active material for a lithium secondary battery comprising:
a lithium-transition metal composite oxide particle including a plurality of primary particles,
wherein the lithium-transition metal composite oxide particle comprises a lithium-potassium-containing portion formed between the primary particles,
wherein a sulfur content of the lithium-transition metal composite oxide particle measured through a carbon- sulfur (CS) analyzer is 1,100 to 4,500 ppm based on a total weight of the lithium-transition metal composite oxide particle.

2. The cathode active material for a lithium secondary battery according to claim 1, wherein the lithium-potassium-containing portion comprises a lithium-potassium-sulfur-containing portion including lithium, potassium and sulfur.

3. The cathode active material for a lithium secondary battery according to claim 1, wherein the primary particles have a hexagonal close-packed structure.

4. The cathode active material for a lithium secondary battery according to claim 3, wherein the lithium-transition metal composite oxide particle has no primary particle having a face centered cubic structure.

5. The cathode active material for a lithium secondary battery according to claim 1, wherein a potassium concentration of the lithium-potassium-containing portion measured through energy dispersive spectroscopy (EDS) is greater than the potassium concentration in the primary particles measured through the EDS.

6. The cathode active material for a lithium secondary battery according to claim 5, wherein an average potassium signal value of the lithium-potassium-containing portion measured through the EDS is 1.2 to 4 times greater than the average potassium signal value in the primary particles measured through the EDS.

7. The cathode active material for a lithium secondary battery according to claim 1, wherein a content of lithium carbonate ($Li_2CO_3$) remaining on the surface of the lithium-transition metal composite oxide particle is 2,500 ppm or less, and a content of lithium hydroxide (LiOH) remaining on the surface of the lithium-transition metal composite oxide particle is 2,500 ppm or less.

8. A lithium secondary battery comprising:
    a cathode comprising a cathode active material layer including the cathode active material for a lithium secondary battery according to claim 1; and
    an anode disposed to face the cathode.

9. A method of manufacturing a cathode active material for a lithium secondary battery, comprising:
    preparing a preliminary lithium-transition metal composite oxide particle;
    mixing the preliminary lithium-transition metal composite oxide particle with a potassium compound aqueous solution; and
    performing a heat treatment on the mixed preliminary lithium-transition metal composite oxide particle and the potassium compound aqueous solution, to prepare a lithium-transition metal composite oxide particle comprising a plurality of primary particles and a lithium-potassium-containing portion formed between the primary particles,
    wherein a sulfur content of the lithium-transition metal composite oxide particle measured through a carbon-sulfur (CS) analyzer is 1,100 to 4,500 ppm based on a total weight of the lithium-transition metal composite oxide particle.

10. The method of manufacturing a cathode active material for a lithium secondary battery according to claim 9, wherein the potassium compound aqueous solution is formed by mixing a solvent with potassium compound powder, and
    an input amount of the potassium compound powder is 0.2 to 1.9% by weight based on a total weight of the preliminary lithium-transition metal composite oxide particle.

11. The method of manufacturing a cathode active material for a lithium secondary battery according to claim 10, wherein an input amount of the solvent is 2 to 15% by weight based on the total weight of the preliminary lithium-transition metal composite oxide particle.

12. The method of manufacturing a cathode active material for a lithium secondary battery according to claim 10, wherein the potassium compound powder is potassium hydrogen sulfate ($KHSO_4$) powder.

13. The method of manufacturing a cathode active material for a lithium secondary battery according to claim 9, wherein the heat treatment is performed at 200 to 400° C. under an oxygen atmosphere.

14. The method of manufacturing a cathode active material for a lithium secondary battery according to claim 9, wherein the preliminary lithium-transition metal composite oxide particle is mixed with the potassium compound aqueous solution without water washing treatment.

* * * * *